United States Patent
Mori et al.

(10) Patent No.: US 11,479,496 B2
(45) Date of Patent: Oct. 25, 2022

(54) METHOD FOR MANUFACTURING GLASS ROLL

(71) Applicant: Nippon Electric Glass Co., Ltd., Shiga (JP)

(72) Inventors: Hiroki Mori, Shiga (JP); Yohei Kirihata, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 235 days.

(21) Appl. No.: 16/766,399

(22) PCT Filed: Oct. 25, 2018

(86) PCT No.: PCT/JP2018/039699
§ 371 (c)(1),
(2) Date: May 22, 2020

(87) PCT Pub. No.: WO2019/102783
PCT Pub. Date: May 31, 2019

(65) Prior Publication Data
US 2020/0346966 A1  Nov. 5, 2020

(30) Foreign Application Priority Data
Nov. 27, 2017  (JP) .............................. JP2017-226808

(51) Int. Cl.
C03B 33/03  (2006.01)
B65H 35/02  (2006.01)
C03B 33/10  (2006.01)

(52) U.S. Cl.
CPC ............. *C03B 33/03* (2013.01); *B65H 35/02* (2013.01); *C03B 33/102* (2013.01)

(58) Field of Classification Search
CPC combination set(s) only.
See application file for complete search history.

(56) References Cited

U.S. PATENT DOCUMENTS

2012/0047957 A1* 3/2012 Dannoux ............... B23K 26/40
65/112
2012/0318024 A1 12/2012 Mori et al.
(Continued)

FOREIGN PATENT DOCUMENTS

| JP | 2012-240883 | 12/2012 |
| WO | 2014/192482 | 12/2014 |
| WO | 2017/208676 | 12/2017 |

OTHER PUBLICATIONS

International Preliminary Report on Patentability and Written Opinion of the International Searching Authority dated Jun. 2, 2020 in International (PCT) Application No. PCT/JP2018/039699.
(Continued)

*Primary Examiner* — Alison L Hindenlang
*Assistant Examiner* — Steven S Lee
(74) *Attorney, Agent, or Firm* — Wenderoth, Lind & Ponack, L.L.P.

(57) ABSTRACT

Provided is a method of producing a glass roll including: a conveying step of conveying a glass film (G) along a longitudinal direction thereof; a cutting step of irradiating the glass film (G) with a laser beam (L) from a laser irradiation apparatus (19) while conveying the glass film (G) by the conveying step, to thereby separate the glass film (G) into a non-product portion (Gc) and a product portion (Gd); and a take-up step of taking up the product portion (Gd) into a roll shape, to thereby form a glass roll (R). The cutting step includes a step of winding a thread-like peeled material (Ge) generated from an end portion of the product portion (Gd) in a width direction around a rod-shaped collecting member (23), and leading the wound thread-like peeled material (Ge) in a predetermined conveying direction (PX) by a leading device (24).

20 Claims, 7 Drawing Sheets

(56) References Cited

U.S. PATENT DOCUMENTS

| | | | |
|---|---|---|---|
| 2015/0165548 A1* | 6/2015 | Marjanovic | C03B 33/091 219/121.73 |
| 2015/0183186 A1* | 7/2015 | Bigelow | B32B 7/05 156/247 |
| 2015/0218034 A1* | 8/2015 | Bigelow | C03B 33/0235 156/271 |
| 2015/0251944 A1* | 9/2015 | Brackley | C03B 33/091 83/76.8 |
| 2015/0299021 A1* | 10/2015 | Itoh | C03B 33/0235 83/887 |
| 2019/0152826 A1* | 5/2019 | Ikai | C03B 17/06 |
| 2020/0079679 A1* | 3/2020 | Mori | C03B 33/0235 |

OTHER PUBLICATIONS

International SearchReport dated Nov. 27, 2018 in International (PCT) Application No. PCT/JP2018/039699.

\* cited by examiner

METHOD FOR MANUFACTURING GLASS ROLL

TECHNICAL FIELD

The present invention relates to a method of producing a glass roll including a band-like glass film taken up into a roll shape.

BACKGROUND ART

As is well known, thinning of glass sheets to be used in flat panel displays (FPD), such as a liquid crystal display and an OLED display, glass sheets to be used in OLED illumination, glass sheets to be used for producing a tempered glass that is a component of a touch panel, and the like, and glass sheets to be used in panels of solar cells, and the like has been promoted in the current circumstances.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method.

For example, an elongated glass film obtained by the continuous forming by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (selvage portions) of the glass film in a width direction are cut and removed. After that, the glass film is taken up into a roll shape with a take-up roller. Thus, a glass roll is formed.

In Patent Literature 1, as a method of cutting both the end portions of the glass film in the width direction, laser cleaving is disclosed. The laser cleaving involves forming an initial crack on the glass film by crack forming means, such as a diamond cutter, and then irradiating the portion with a laser beam to heat the portion, followed by cooling the heated portion by cooling means to develop the initial crack through a thermal stress generated in the glass film, to thereby cut the glass film.

As another cutting method, in Patent Literature 2, there is disclosed a cutting technology for a glass film involving utilizing a so-called peeling phenomenon. The technology involves irradiating the glass film (glass substrate) with a laser beam to melt-cut part of the glass film while conveying the glass film, and moving the melt-cut portion away from a laser beam irradiation region to cool the portion.

In this case, when the melt-cut portion is cooled, a substantially thread-like peeled material is generated (for example, see paragraph 0067 and FIG. 8 of Patent Literature 2). A phenomenon in which the thread-like peeled material is peeled off from an end portion of the glass film is generally called peeling. When the thread-like peeled material is generated, a uniform cut surface is formed on the glass film.

CITATION LIST

Patent Literature 1: JP 2012-240883 A
Patent Literature 2: WO 2014/192482 A1

SUMMARY OF INVENTION

Technical Problem

Further, in Patent Literature 2, as a method of removing the thread-like peeled material, for example, blowing off by a gas, suction, and the use of a brush, a baffle plate, or the like are described (see paragraph 0073 of Patent Literature 2).

However, when the thread-like peeled material is removed by the above-mentioned means during cutting of the glass film, there is a risk in that the thread-like peeled material is broken in a middle thereof, and a fragment thereof adheres to the glass film to damage the surface of the glass film. Therefore, it is desired that the thread-like peeled material be continuously collected so that the thread-like peeled material is not broken in the middle thereof.

The present invention has been made in view of the above-mentioned circumstances, and an object of the present invention is to provide a method of producing a glass roll capable of collecting a thread-like peeled material without breaking the thread-like peeled material.

Solution to Problem

As a measure to achieve the above-mentioned object, according to one embodiment of the present invention, there is provided a method of producing a glass roll including a band-like glass film taken up into a roll shape, the method comprising: conveying step of conveying the glass film along a longitudinal direction thereof; a cutting step of irradiating the glass film with a laser beam from a laser irradiation apparatus while conveying the glass film by the conveying step, to thereby separate the glass film into a non-product portion and a product portion; and a take-up step of taking up the product portion into a roll shape, to thereby form a glass roll, the cutting step comprising a step of winding a thread-like peeled material generated from an end portion of the product portion in a width direction around a rod-shaped collecting member, and leading the wound thread-like peeled material in a predetermined conveying direction by a leading device.

With such a configuration, in the cutting step, the thread-like peeled material generated from the product portion is wound around the collecting member, and is led in the conveying direction by the leading device, thereby being capable of continuously collecting the thread-like peeled material. With this, the thread-like peeled material is collected without being broken in a middle thereof, and a fragment thereof does not adhere to the product portion. Accordingly, with the method according to the embodiment of the present invention, the glass roll can be produced efficiently while the product portion is prevented from being damaged.

Further, it is desired that the leading device be arranged above the collecting member. With such a configuration, the leading device can suitably lead the thread-like peeled material along the conveying direction while maintaining the state in which the thread-like peeled material is wound around the collecting member.

Further, there may be adopted a configuration in which the leading device comprises: an endless belt; and a projecting portion provided on an outer peripheral surface of the belt. With such a configuration, through rotation of the belt, the projecting portion can be moved in the predetermined direction. Therefore, the projecting portion is brought into contact with the thread-like peeled material so that the thread-like peeled material can be led along a moving direction of the projecting portion.

Further, it is desired that the leading device be located on a downstream side of a tip end portion of the collecting member in the conveying direction. With this, the leading device can lead the thread-like peeled material wound around the collecting member without hindering collection of the collecting member by the tip end portion.

It is desired that the collecting member comprise: a first guiding portion extending in a lateral direction; a second guiding portion located on a downstream side of the first guiding portion in the conveying direction and inclined downward toward the downstream side in the conveying direction; and a third guiding portion extending in the vertical direction and being located on a downstream side of the second guiding portion in the conveying direction. With such a configuration, the conveying direction can be changed without breaking the thread-like peeled material.

Further, it is desired that part of the leading device be located above the second guiding portion. With such a configuration, the thread-like peeled material is guided along a direction of inclination of the second guiding portion so that leading of the thread-like peeled material by the leading device can be canceled. With this, the leading device can lead the thread-like peeled material without hindering change of the conveying direction of the thread-like peeled material.

Advantageous Effects of Invention

According to the present invention, the thread-like peeled material can be collected without being broken.

DESCRIPTION OF EMBODIMENTS

Now, an embodiment of the present invention is described with reference to the drawings. In each of FIG. 1 to FIG. 6, an embodiment of a method of producing a glass roll according to the present invention is illustrated.

Figure 1:
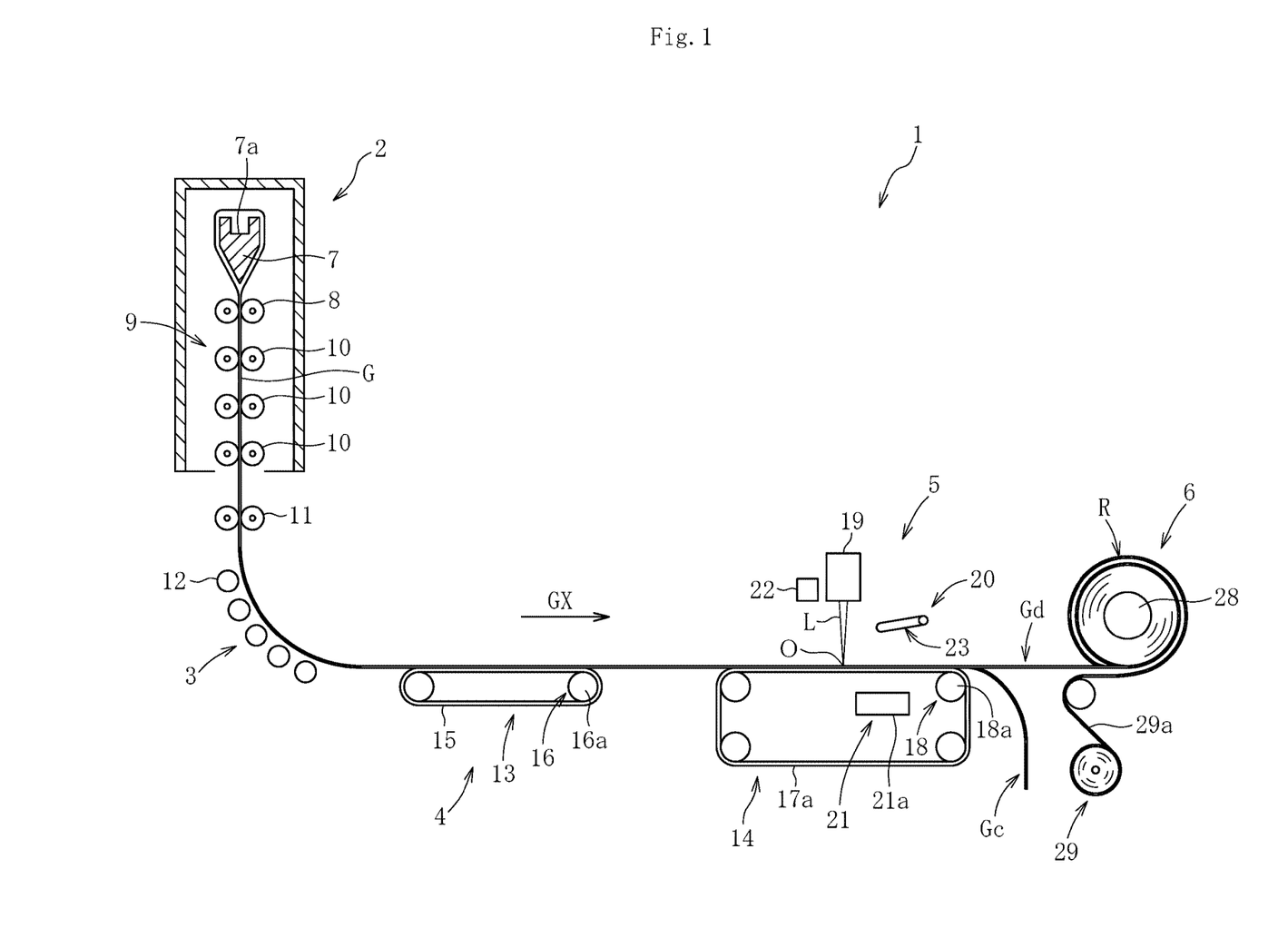
FIG. 1 is a schematic side view for illustrating an apparatus for producing a glass roll.

FIG. 1 is a schematic side view for schematically illustrating an overall configuration of an apparatus for producing a glass roll. As illustrated in FIG. 1, a production apparatus 1 comprises: a forming portion 2 configured to form a glass film G; a direction conversion portion 3 configured to convert a traveling direction of the glass film G from a vertically downward direction to a lateral direction; a lateral conveying portion 4 configured to convey the glass film G in the lateral direction after the direction conversion; a cutting portion 5 configured to cut end portions (selvage portions) Ga and Gb of the glass film G in a width direction as non-product portions Gc while the glass film G is conveyed in the lateral direction with the lateral conveying portion 4; and a take-up portion 6 configured to take up a product portion Gd into a roll shape to form a glass roll R, the product portion Gd being obtained by cutting and removing the non-product portions Gc with the cutting portion 5. In this embodiment, the thickness of the product portion Gd is set to 300 μm or less, preferably 100 μm or less.

The forming portion 2 comprises: a forming body 7 having a substantially wedge shape in a sectional view in which an overflow groove 7a is formed on an upper end portion thereof; edge rollers 8 arranged immediately below the forming body 7 and configured to sandwich molten glass overflowing from the forming body 7 from both front and back surface sides of the molten glass; and an annealer 9 arranged immediately below the edge rollers 8.

The forming portion 2 is configured to cause the molten glass overflowing from an upper portion of the overflow groove 7a of the forming body 7 to flow down along both side surfaces of the forming body 7 to be joined at a lower end of the forming body 7, to thereby form a molten glass in a film shape. The edge rollers 8 are configured to control shrinkage of the molten glass in a width direction to form the glass film G having a predetermined width. The annealer 9 is configured to perform strain removal treatment on the glass film G. The annealer 9 comprises annealer rollers 10 arranged in a plurality of stages in a vertical direction.

Support rollers 11 configured to sandwich the glass film G from both the front and back surface sides are arranged below the annealer 9. A tension for encouraging thinning of the glass film G is applied between the support rollers 11 and the edge rollers 8 or between the support rollers 11 and the annealer rollers 10 at any one position.

The direction conversion portion 3 is arranged at a position below the support rollers 11. In the direction conversion portion 3, a plurality of guide rollers 12 configured to guide the glass film G are arranged in a curved form. Those guide rollers 12 are configured to guide the glass film G, which has been conveyed in the vertical direction, in the lateral direction.

The lateral conveying portion 4 is arranged in a forward traveling direction with respect to (on a downstream side of) the direction conversion portion 3. The lateral conveying portion 4 comprises: a first conveying device 13; and a second conveying device 14. The first conveying device 13 is arranged on a downstream side of the direction conversion portion 3, and the second conveying device 14 is arranged on a downstream side of the first conveying device 13.

The first conveying device 13 comprises: an endless belt-like conveyor belt 15; and a driver 16 for the conveyor belt 15. The first conveying device 13 is configured to continuously convey the glass film G having passed through the direction conversion portion 3 to a downstream side by bringing an upper surface of the conveyor belt 15 into contact with the glass film G. The driver 16 comprises: a driving body 16*a* for driving the conveyor belt 15, such as a roller or a sprocket; and a motor (not shown) configured to rotate the driving body 16*a*.

Figure 2:
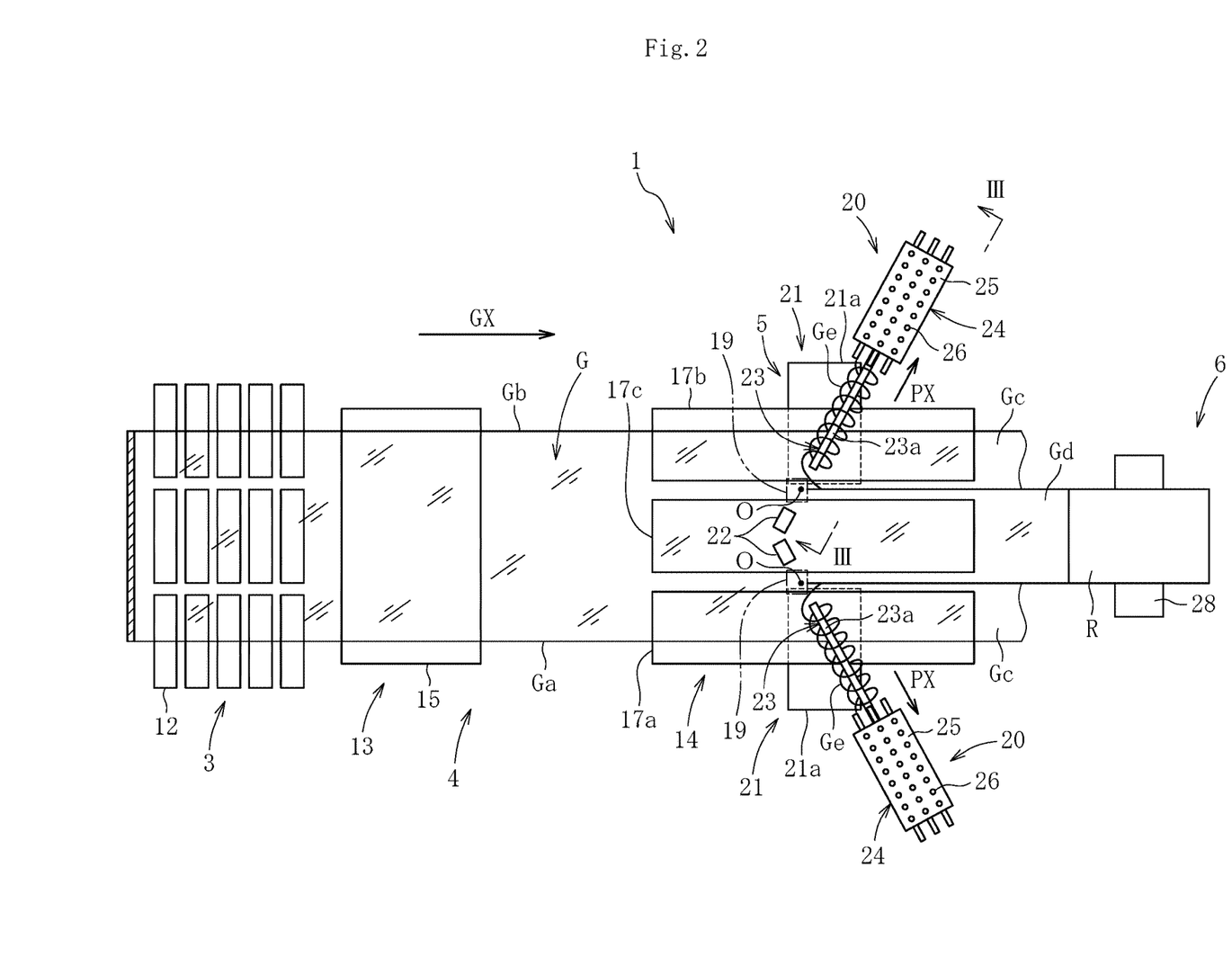
FIG. 2 is a partial plan view for illustrating the apparatus for producing a glass roll.

The second conveying device 14 comprises: a plurality of (in this example, three) conveyor belts 17*a* to 17*c* each configured to convey the glass film G; and a driver 18 for the conveyor belts 17*a* to 17*c*. As illustrated in FIG. 2, the conveyor belts 17*a* to 17*c* include: the first conveyor belt 17*a* to be brought into contact with the one end portion Ga of the glass film G in the width direction; the second conveyor belt 17*b* to be brought into contact with the other end portion Gb of the glass film G in the width direction; and the third conveyor belt 17*c* to be brought into contact with a middle portion of the glass film G in the width direction. The driver 18 comprises: a driving body 18*a* for driving the conveyor belts 17*a* to 17*c*, such as a roller or a sprocket; and a motor (not shown) configured to rotate the driving body 18*a*.

As illustrated in FIG. 2, the conveyor belts 17*a* to 17*c* are arranged so as to be spaced apart from one another in the width direction of the glass film G. With this, gaps are formed between the first conveyor belt 17*a* and the third conveyor belt 17*c* and between the second conveyor belt 17*b* and the third conveyor belt 17*c*.

Figure 3:
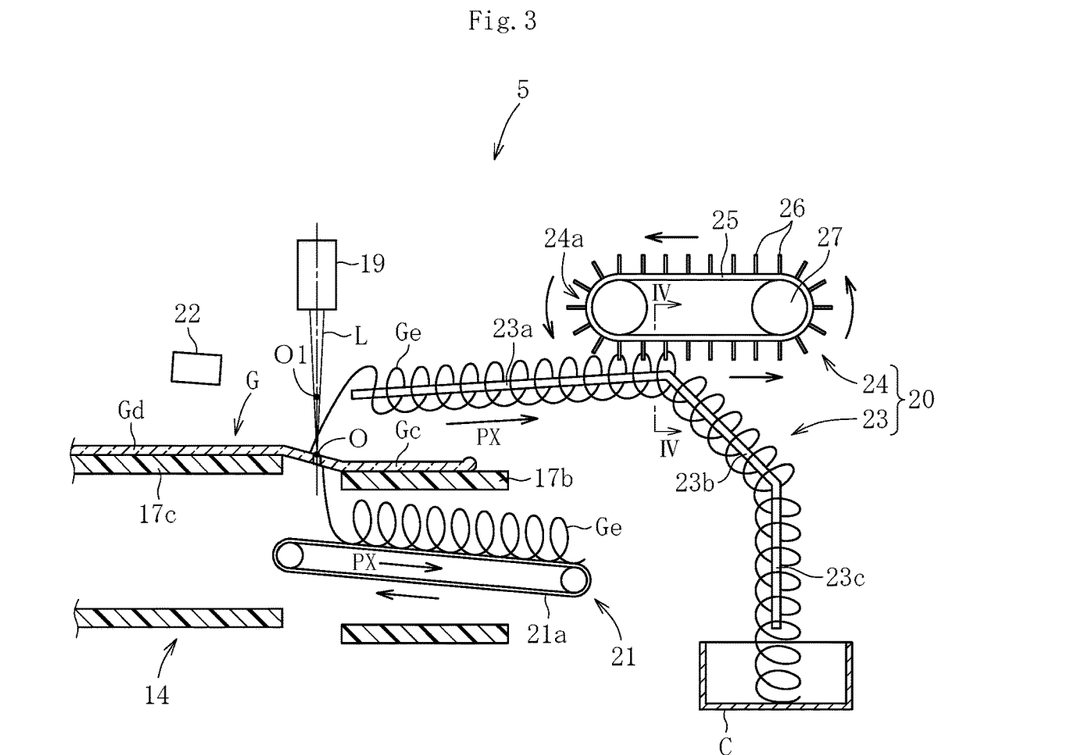
FIG. 3 is a sectional view taken along the line III-III of FIG. 2.

As illustrated in FIG. 3, the third conveyor belt 17*c* is configured to support the glass film G so that an upper portion of the third conveyor belt 17*c* is located at a higher level than an upper portion of the first conveyor belt 17*a*. While the illustration is omitted, the upper portion of the first conveyor belt 17*a* and an upper portion of the second conveyor belt 17*b* are set to the same height. As described above, a difference in height is made between the upper portion of the third conveyor belt 17*c* and each of the upper portion of the first conveyor belt 17*a* and the upper portion of the second conveyor belt 17*b*, and hence the glass film G to be conveyed is conveyed with the conveyor belts 17*a* to 17*c* under a state in which the middle portion thereof in the width direction is deformed so as to protrude upward with respect to each of the end portions Ga and Gb in the width direction. In addition, when the glass film G is cut with the cutting portion 5, the product portion Gd is conveyed with the third conveyor belt 17*c* at a position higher than those of the non-product portions Gc.

As illustrated in FIG. 1 to FIG. 3, the cutting portion 5 comprises: a laser irradiation apparatus 19 arranged at a portion above the second conveying device 14; a plurality of collecting devices 20 and 21 each configured to collect a thread-like peeled material Ge generated when the glass film G is irradiated with a laser beam L from the laser irradiation apparatus 19; and an air nozzle 22 configured to blow an air toward some of the devices, that is, the collecting device 20.

The laser irradiation apparatus 19 has a configuration in which the laser beam L, such as a $CO_2$ laser, a YAG laser, or any other laser, is radiated downward. The laser beam L is radiated to a predetermined position (irradiation position) 0 of the glass film G. In this embodiment, two laser irradiation apparatus 19 are arranged so that both the end portions Ga and Gb of the glass film G in the width direction are cut (see FIG. 2). As illustrated in FIG. 2, the irradiation positions O with the laser beam L are set so as to correspond to the gap between the first conveyor belt 17*a* and the third conveyor belt 17*c* and the gap between the second conveyor belt 17*b* and the third conveyor belt 17*c* in the second conveying device 14.

As illustrated in FIG. 2 and FIG. 3, the collecting devices 20 and 21 include: a first collecting device 20 arranged above the glass film G; and a second collecting device 21 arranged below the glass film G. The first collecting device 20 is configured to collect a thread-like peeled material Ge generated from the product portion Gd, and the second collecting device 21 is configured to collect a thread-like peeled material Ge generated from the non-product portion Gc. In this embodiment, two first collecting devices 20 and two second collecting devices 21 are arranged at predetermined positions.

The first collecting device 20 is configured to convey the thread-like peeled material Ge formed continuously so as to extend upward from the product portion Gd as described above in a direction of separating away from the second conveying device 14 (hereinafter referred to as "conveying direction of thread-like peeled material") PX.

The first collecting device 20 comprises: a rod-shaped collecting member 23; and a leading device 24 configured to lead the thread-like peeled material Ge in the conveying direction PX.

The collecting member 23 is made of metal. However, the material of the collecting member 23 is not limited thereto, and the collecting member 23 may be made of a resin or any other material. As illustrated in FIG. 2, the collecting member 23 is arranged on a downstream side of the laser irradiation apparatus 19 in a conveying direction GX of the glass film G. The collecting member 23 is arranged along the conveying direction PX of the thread-like peeled material Ge.

As illustrated in FIG. 3, the collecting member 23 comprises: a first guiding portion 23*a* extending in a lateral direction; a second guiding portion 23*b* located on a downstream side of the first guiding portion 23*a* in the conveying direction PX of the thread-like peeled material Ge; and a third guiding portion 23*c* located on a downstream side of the second guiding portion 23*b* in the conveying direction PX of the thread-like peeled material Ge. The collecting member 23 guides the thread-like peeled material Ge to the first guiding portion 23*a*, the second guiding portion 23*b*, and the third guiding portion 23*c* in the stated order to change the conveying direction PX of the thread-like peeled material Ge from the lateral direction to a vertical direction.

The first guiding portion 23*a* is a portion that first captures the thread-like peeled material Ge generated from the product portion Gd. The first guiding portion 23*a* is arranged in such an inclined manner that a tip end portion thereof is directed to an upstream side of the conveying direction GX of the glass film G in plan view (see FIG. 2). The collecting member 23 is inclined at preferably from about 10° to about 60°, more preferably from about 20° to about 40° with respect to a direction perpendicular to the conveying direction GX of the glass film G (the width direction of the glass film G), but the inclination angle is not limited thereto. As described above, when the first guiding portion 23*a*, which is arranged on the downstream side of the laser irradiation apparatus 19, is arranged so that the tip end portion thereof is directed to the upstream side, the thread-like peeled material Ge generated from the product portion Gd can be suitably captured on a downstream side of the irradiation position O with the laser beam L.

As illustrated in FIG. 2, the first guiding portion 23*a* is arranged so that at least part thereof, for example, the tip end portion overlaps the non-product portion Gc. In other words, the tip end portion of the collecting member 23 does not overlap the product portion Gd in plan view. When the first guiding portion 23*a* is arranged in such a manner, the thread-like peeled material Ge wound around the collecting member 23 is prevented from being brought into contact with the product portion Gd, and the product portion Gd can be prevented from being damaged.

Further, as illustrated in FIG. 3, the first guiding portion 23a is arranged so that the tip end portion thereof is directed to a position O1 above the irradiation position O of the glass film G with the laser beam L. The position O1 is located on a vertical line (line represented by the alternate long and short dash line) passing through the irradiation position O with the laser beam L.

The thread-like peeled material Ge extends upward from the product portion to some extent, and is then deformed into a helical shape. Accordingly, the tip end portion of the first guiding portion 23a is directed to the position O1 above the irradiation position O with the laser beam L so that, when the thread-like peeled material Ge is deformed into a helical shape, the tip end portion of the first guiding portion 23a can be directed to a substantially center position of the helical shape. With this, the tip end portion of the first guiding portion 23a can be inserted into a center of the thread-like peeled material Ge having a helical shape so that the thread-like peeled material Ge can be reliably captured.

As illustrated in FIG. 3, the first guiding portion 23a is arranged in such an inclined manner that the tip end portion thereof is directed downward in side view. In this embodiment, the first guiding portion 23a is inclined at about 5° with respect to a horizontal direction, but the inclination angle is not limited thereto. Further, the first guiding portion 23a may be formed horizontally. With the inclined arrangement described above, the tip end portion of the first guiding portion 23a is directed to the thread-like peeled material Ge extending upward from below. Accordingly, the first guiding portion 23a can suitably capture the thread-like peeled material Ge generated from the product portion Gd.

The second guiding portion 23b is configured to guide the thread-like peeled material Ge passing through the first guiding portion 23a toward the third guiding portion 23c. As illustrated in FIG. 3, the second guiding portion 23b is inclined downward toward the downstream side in the conveying direction PX of the thread-like peeled material Ge, that is, from the first guiding portion 23a side toward the third guiding portion 23c side. The second guiding portion 23b is formed straight. However, the second guiding portion 23b is not limited to this configuration, and may be formed into an arc shape or any other curved shape.

The third guiding portion 23c is configured to guide the thread-like peeled material Ge passing through the second guiding portion 23b downward. As illustrated in FIG. 3, the third guiding portion 23c is a straight portion extending downward from the lower end portion of the second guiding portion 23b. A collecting container C, which is configured to receive the thread-like peeled material Ge having passed through the third guiding portion 23c, is arranged below the third guiding portion 23c.

Figure 4:
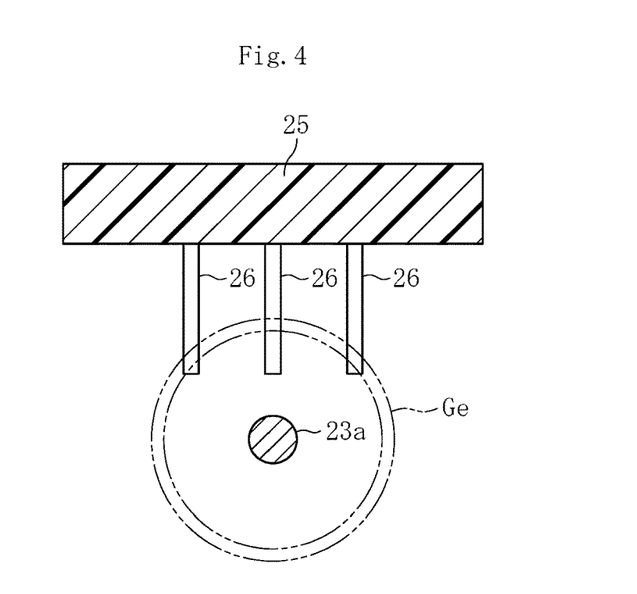
FIG. 4 is a sectional view taken along the line IV-IV of FIG. 3.

As illustrated in FIG. 3 and FIG. 4, the leading device 24 is arranged above the collecting member 23. The leading device 24 comprises: an endless belt 25; projecting portions 26 fixed to an outer peripheral surface of the belt 25; and a drive unit 27 configured to drive the belt 25.

The belt 25 is formed of, for example, a rubber belt. However, the belt 25 is not limited thereto, and may be formed of a chain belt or any other belt.

The projecting portions 26 are each formed of a rod-shaped body (pin) made of metal. The projecting portions 26 are each formed into a columnar shape, but are not limited to this shape. The projecting portions 26 are removably fixed to the outer peripheral surface of the belt 25. On the outer peripheral surface of the belt 25, there are arranged a plurality of (a plurality of rows and columns of) projecting portions 26 at intervals. In this embodiment, description is made of an example in which three projecting portions 26 are arranged at equal intervals in a row. However, the number and the intervals of projecting portions 26 can be freely set. The projecting portions 26 having the same shape with the same diameter and length are used, but the projecting portions 26 are not limited to this configuration.

The drive unit 27 comprises: a sprocket; a pulley; a roller; and other rotary drive bodies. The drive unit 27 is held in contact with an inner peripheral surface of the belt 25. The drive unit 27 is driven by a motor (not shown) to rotate the belt 25 in a direction indicated by the arrows illustrated in FIG. 3.

The leading device 24 is located on the downstream side of the tip end portion of the first guiding portion 23a in the collecting member 23 in the conveying direction PX of the thread-like peeled material Ge. That is, as illustrated in FIG. 3, an upstream end portion 24a of the leading device 24 is located on the downstream side of the tip end portion of the first guiding portion 23a in the conveying direction PX of the thread-like peeled material Ge. With this, the first collecting device 20 first captures the thread-like peeled material Ge generated from the product portion Gd forming a helical shape by the first guiding portion 23a, and then, moves the captured thread-like peeled material Ge to the downstream side in the conveying direction PX through leading by the leading device 24 while maintaining a state in which the captured thread-like peeled material Ge forms the helical shape.

As illustrated in FIG. 2 and FIG. 3, the leading device 24 is located above the collecting member 23 so as to overlap the first guiding portion 23a and the second guiding portion 23b of the collecting member 23. That is, part of the leading device 24 on the upstream side in the conveying direction PX of the thread-like peeled material Ge is located above the first guiding portion 23a, and part of the leading device 24 on the downstream side is located above the second guiding portion 23b.

As illustrated in FIG. 3, the second collecting device 21 is formed of a belt conveyor 21a. In this embodiment, two belt conveyors 21a corresponding to the end portions Ga and Gb of the glass film G are arranged. Each of the belt conveyors 21a is arranged so that the belt conveyor is inclined downward from an inward side of the glass film G in the width direction to an outward side of the glass film G in the width direction. Each of the belt conveyors 21a is configured to convey the thread-like peeled material Ge in a direction perpendicular to the conveying direction GX (longitudinal direction) of the glass film G (in the width direction), that is, from the inward side to the outward side of the glass film G in the width direction.

As illustrated in FIG. 3, the air nozzle 22 is arranged above the second conveying device 14. Further, the air nozzle 22 is arranged so as to face the collecting member 23 of the first collecting device 20. With this configuration, the air nozzle 22 is configured to blow an air toward the tip end portion of the first guiding portion 23a of the collecting member 23. In addition, the air nozzle 22 may also be configured to blow an air toward the melt-cut portion formed on the irradiation position O of the glass film G with the laser beam L on the second conveying device 14.

When an air is blown from the air nozzle 22 toward the tip end portion of the first guiding portion 23a, the thread-like peeled material Ge generated from the melt-cut portion of the glass film G can be moved toward the first guiding portion 23a, and the thread-like peeled material Ge wound around the first guiding portion 23a can be moved to the downstream side in the conveying direction PX.

The take-up portion 6 is arranged on a downstream side of the cutting portion 5 and the second conveying device 14. The take-up portion 6 comprises: a take-up roller 28; a motor (not shown) configured to rotationally drive the take-up roller 28; and a protective sheet supply portion 29 configured to supply a protective sheet 29a to the take-up roller 28. The take-up portion 6 is configured to take up the product portion Gd into a roll shape by rotating the take-up roller 28 with the motor while causing the protective sheet 29a supplied from the protective sheet supply portion 29 to overlap the product portion Gd. The product portion Gd having been taken up forms the glass roll R.

A method of producing the glass roll R with the production apparatus 1 having the above-mentioned configuration is described below. The method of producing the glass roll R comprises: a forming step of forming the band-like glass film G with the forming portion 2; a conveying step of conveying the glass film G with the direction conversion portion 3 and the lateral conveying portion 4; a cutting step of cutting the end portions Ga and Gb of the glass film G in the width direction with the cutting portion 5; and a take-up step of taking up the product portion Gd with the take-up portion 6 after the cutting step.

In the forming step, molten glass overflowing from an upper portion of the overflow groove 7a of the forming body 7 in the forming portion 2 is caused to flow down along both side surfaces of the forming body 7 to be joined at a lower end of the forming body 7, to thereby form a molten glass in a film shape. At this time, the shrinkage of the molten glass in a width direction is controlled with the edge rollers 8, and thus the glass film G having a predetermined width is formed. After that, strain removal treatment is performed on the glass film G with the annealer 9. The glass film G having a predetermined thickness is formed through a tension applied by the support rollers 11.

In the conveying step, the conveying direction of the glass film G is converted from a vertical direction to a lateral direction GX with the direction conversion portion 3, and the glass film G is conveyed to the take-up portion 6 on a downstream side with the conveying devices 13 and 14.

In the cutting step, while the glass film G is conveyed with the second conveying device 14, the glass film G is irradiated with the laser beam L from the laser irradiation apparatus 19 of the cutting portion 5, and both the end portions Ga and Gb of the glass film G in the width direction are cut. With this, the glass film G is separated into the non-product portions Gc and the product portion Gd. In addition, in the cutting step, the thread-like peeled materials Ge generated from the non-product portions Gc and the product portion Gd are collected with the first collecting device 20 and the second collecting device 21 (collecting step).

Figure 5A:
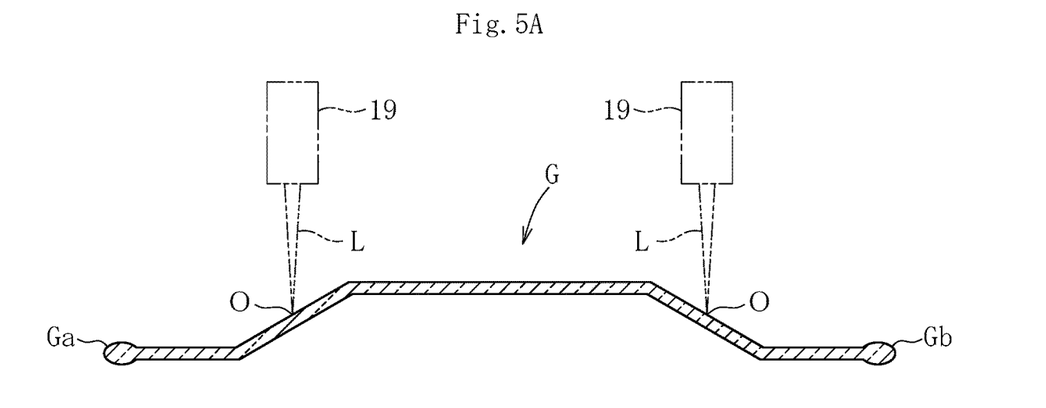
FIG. 5A is a view for illustrating a mechanism for the generation of a thread-like peeled material, and is a sectional view for illustrating a state in which a glass film is irradiated with a laser beam.
Figure 5B:
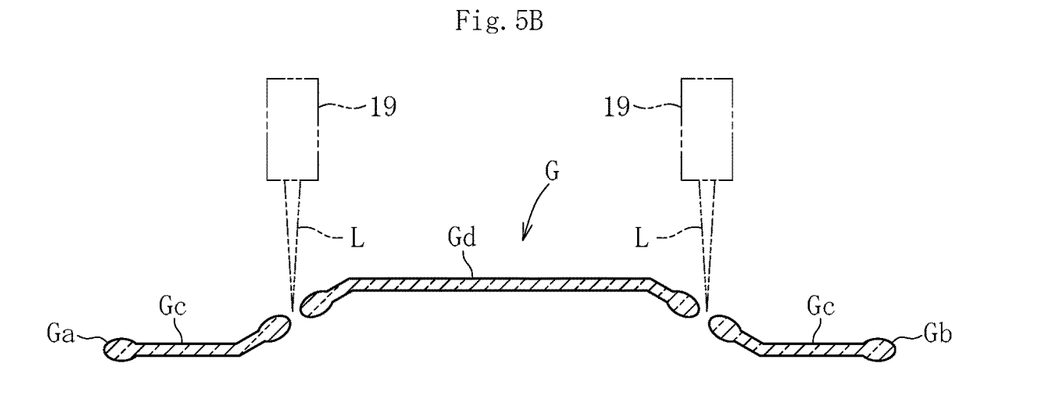
FIG. 5B is a sectional view for illustrating a state in which the glass film is melt-cut through irradiation with the laser beam.

Here, a mechanism for the generation of the thread-like peeled material Ge is described with reference to FIG. 5. When the glass film G is irradiated with the laser beam L as illustrated in FIG. 5A, part of the glass film G is melt-cut by being heated with the laser beam L as illustrated in FIG. 5B. The glass film G is conveyed by the second conveying device 14, and hence the melt-cut portion is moved away from the laser beam L.

Figure 5C:
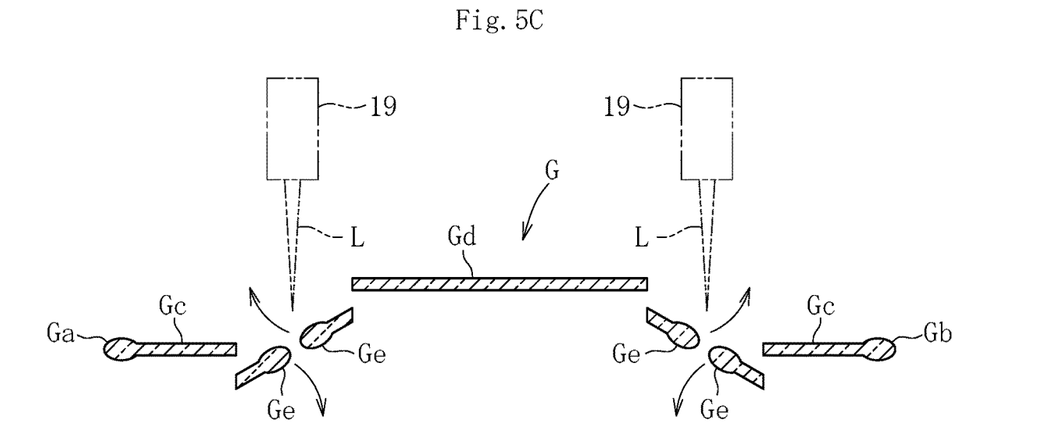
FIG. 5C is a sectional view for illustrating a state in which the thread-like peeled material is generated from each of a product portion and a non-product portion.

With this, the melt-cut portion of the glass film G is cooled. Through the cooling, a heat strain occurs in the melt-cut portion, and a stress generated by the heat strain acts as a tensile force in a portion not having been melt-cut. With the action, as illustrated in FIG. 5C, the thread-like peeled material Ge is separated from each of an end portion of the non-product portion Gc in a width direction and an end portion of the product portion Gd in a width direction.

As already described, the vertical position of the third conveyor belt 17c configured to convey the product portion Gd is set to be higher than the vertical positions of the first conveyor belt 17a and the second conveyor belt 17b configured to convey the non-product portions Gc. With such a positional relationship, the thread-like peeled material Ge generated from the non-product portion Gc is caused to move to a portion below the product portion Gd. Meanwhile, the thread-like peeled material Ge generated from the product portion Gd is deformed so as to extend upward because there is no obstacle.

Now, a collecting method (collecting step) for the thread-like peeled material Ge by the first collecting device 20 is described. The thread-like peeled material Ge generated from the product portion Gd extends upward while being deformed into a helical shape in the middle thereof. The tip end portion of the first guiding portion 23a of the collecting member 23 is inserted into a substantial center of the helical shape in accordance with the deformation of the thread-like peeled material Ge. The thread-like peeled material Ge moves so as to be wound around the first guiding portion 23a while being deformed into a helical shape. During the movement, part of the thread-like peeled material Ge is brought into contact with the first guiding portion 23a in some cases. The first guiding portion 23a is configured to guide the thread-like peeled material Ge to the second guiding portion 23b on the downstream side while being held in contact with (supported on) the part of the thread-like peeled material Ge.

Figure 6:
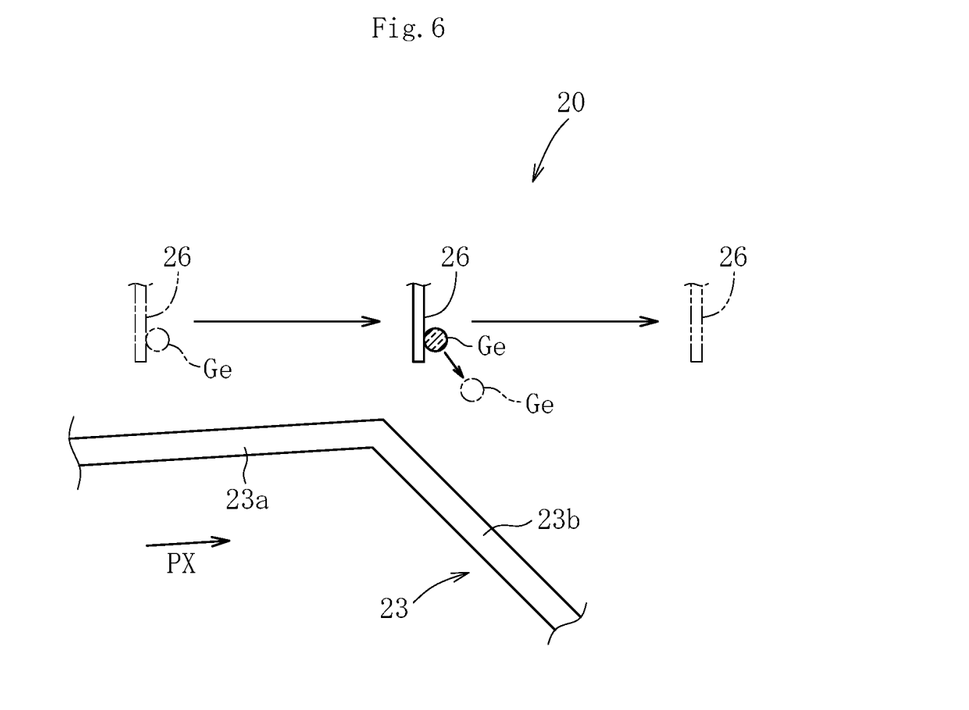
FIG. 6 is a partially enlarged view for illustrating a method of producing a glass roll.
Figure 7:
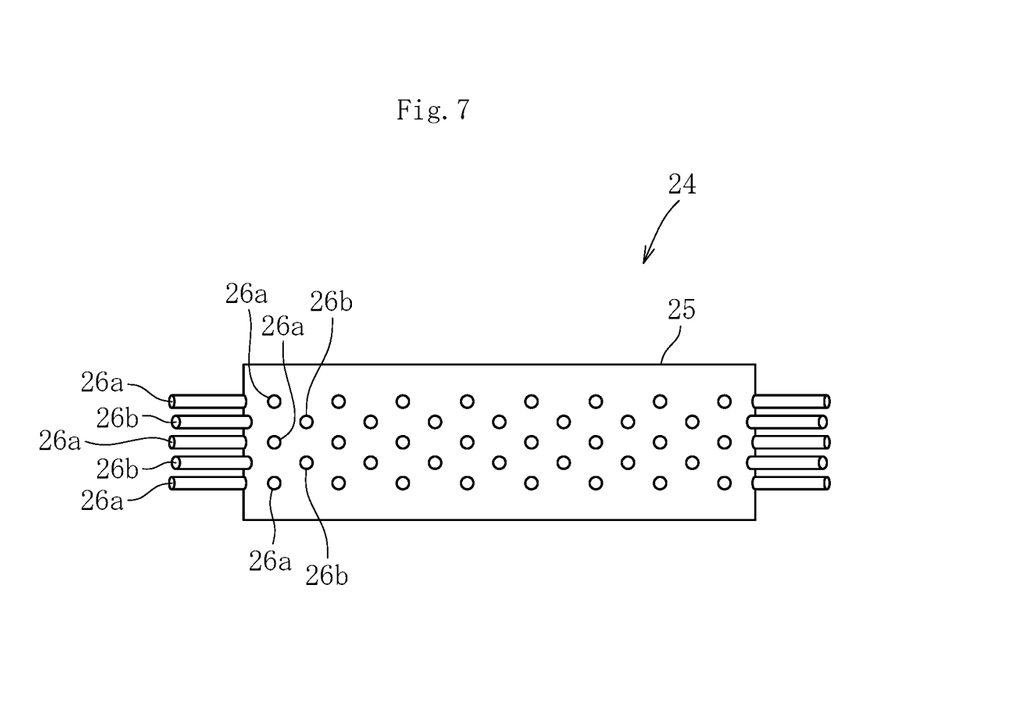
FIG. 7 is a plan view of a leading device, for illustrating another example of a collecting device.

The leading device 24 is configured to drive the belt 25 by the drive unit 27, and move the projecting portions 26 along the conveying direction PX of the thread-like peeled material Ge under a state in which the projecting portions 26 are protruded downward from the belt 25 above the collecting member 23. The projecting portions 26 are brought into contact with part of the thread-like peeled material Ge during the movement. As illustrated in FIG. 6, the projecting portions 26 advance along the conveying direction PX and lead the thread-like peeled material Ge being in contact with the projecting portions 26 to the downstream side in the conveying direction PX. When the projecting portions 26 reach a portion above the second guiding portion 23b (position indicated by the solid line of FIG. 6), the thread-like peeled material Ge moves downward through guiding of the second guiding portion 23b (indicated by the alternate long and two short dashes line of FIG. 6), and is automatically separated away from the projecting portions 26.

The thread-like peeled material Ge separated away from the projecting portions 26 is guided downward along a direction of inclination of the second guiding portion 23b, and moves to the third guiding portion 23c. After that, the thread-like peeled material Ge is guided downward by the third guiding portion 23c. The thread-like peeled material Ge is separated away from the third guiding portion 23c, and then is received in the collecting container C (see FIG. 3).

The non-product portions Gc are conveyed to a downstream side with the first conveyor belt 17a and the second conveyor belt 17b of the second conveying device 14, and collected on an upstream side of the take-up portion 6 with another collecting device not shown in the figures.

In the take-up step, the product portion Gd having been conveyed with the second conveying device 14 is taken up into a roll shape with the take-up roller 28 of the take-up portion 6 while the protective sheet 29a is supplied to the product portion Gd from the protective sheet supply portion 29. When the product portion Gd having a predetermined length is taken up with the take-up roller 28, the glass roll R is completed.

With the method of producing the glass roll R according to this embodiment described above, in the cutting step, the thread-like peeled material Ge generated on the product portion Gd side is wound around the collecting member 23 of the first collecting device 20, and is led to the downstream side in the conveying direction PX by the leading device 24, thereby being capable of continuously collecting the thread-like peeled material Ge. In addition, the thread-like peeled material Ge generated on the non-product portion Gc side can be continuously collected with the belt conveyor 21a of the second collecting device 21. With this, each thread-like peeled material Ge is collected without being broken in the middle thereof, and such a situation that a fragment thereof adheres to the glass film G can be prevented. Accordingly, in this method, the glass roll R can be produced efficiently while the glass film G is prevented from being damaged.

FIG. 7 to FIG. 11 are illustrations of other examples of the collecting device. In the example illustrated in FIG. 7, arrangement of a plurality of projecting portions 26a and 26b in the leading device 24 is different from that in the above-mentioned embodiment. That is, in this example, on the outer peripheral surface of the belt 25, a row comprising three projecting portions 26a and a row comprising two projecting portions 26b are arranged alternately (in a staggered pattern) in a circumferential direction of the belt 25.

Figure 8:
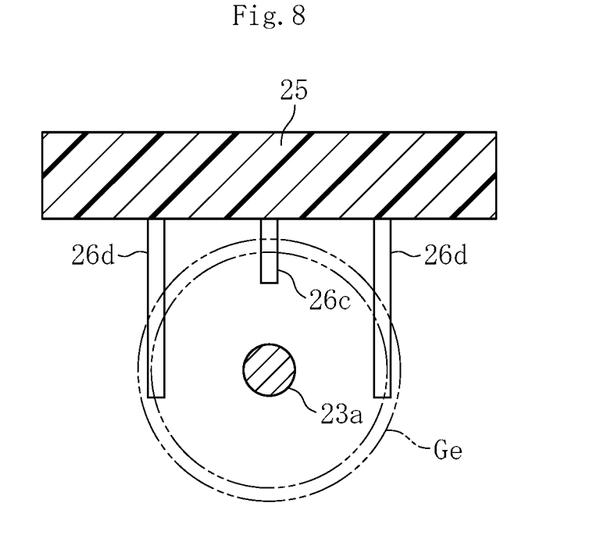
FIG. 8 is a sectional view for illustrating another example of the collecting device.

In the example illustrated in FIG. 8, shapes of projecting portions 26c and 26d of the leading device 24 are different from that in the above-mentioned embodiment. In the above-mentioned embodiment, the plurality of projecting portions 26 having the same length are provided on the belt 25. However, in this example, the projecting portions 26c and 26d having different lengths are provided on the belt 25. The projecting portions 26c and 26d comprise: a first projecting portion 26c located at the middle of the belt 25 in a width direction; and two second projecting portions 26d located at positions closer to end portions of the belt 25 in the width direction than the first projecting portion 26c. The first projecting portion 26c is formed to be shorter than the second projecting portions 26d. The first projecting portion 26c is located above the first guiding portion 23a in the collecting member 23. The second projecting portions 26d overlap the first guiding portion 23a at tip end portions thereof in the vertical direction. With this, the first guiding portion 23a is located between the two second projecting portions 26d.

Figure 9:
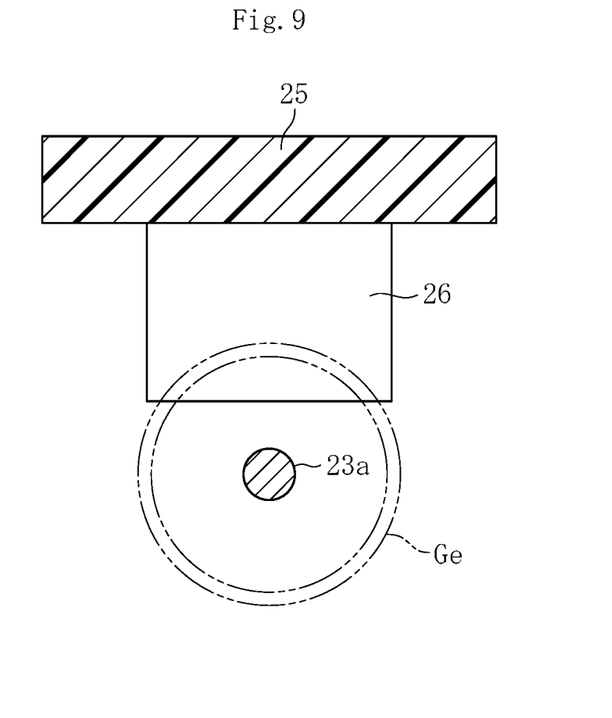
FIG. 9 is a sectional view for illustrating another example of the collecting device.
Figure 10:
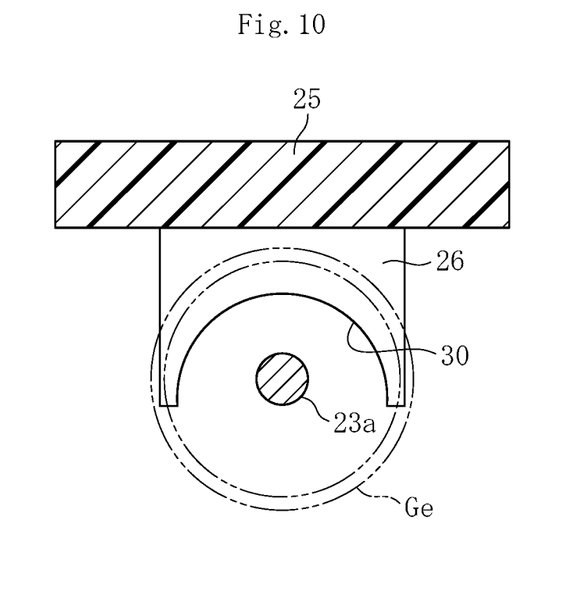
FIG. 10 is a sectional view for illustrating another example of the collecting device.

In examples illustrated in FIG. 9 and FIG. 10, a shape of a projecting portion 26 according to the leading device 24 is different from that in the above-mentioned embodiment. In the above-mentioned embodiment, the projecting portions 26 are each formed of a rod-shaped member. However, in the example illustrated in FIG. 9, the projecting portion 26 is formed of a plate-shaped member. Further, in the example illustrated in FIG. 10, a concave portion 30 having a curved shape is formed at part (lower portion) of the plate-shaped member forming the projecting portion 26. With this, the projecting portion 26 is not brought into contact with the first guiding portion 23a of the collecting member 23, and can be brought into contact with the thread-like peeled material Ge in a wider range.

Figure 11:
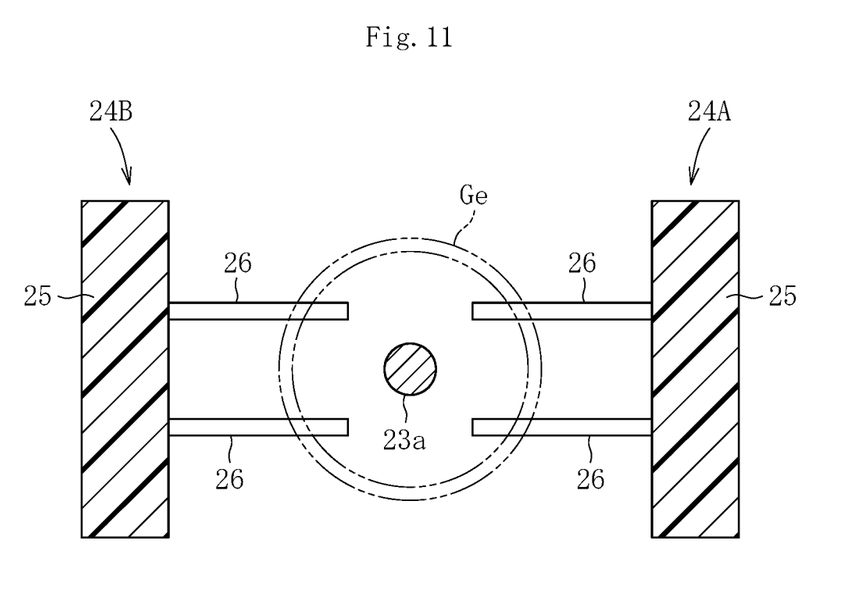
FIG. 11 is a sectional view for illustrating another example of the collecting device.

In the example illustrated in FIG. 11, positions of leading devices 24A and 24B are different from that in the above-mentioned embodiment. In this example, the leading devices 24A and 24B comprise a first leading device 24A and a second leading device 24B arranged on sides of the collecting member 23 (first guiding portion 23a). Each of the leading devices 24A and 24B comprises a plurality of projecting portions 26 protruding sideways from the outer peripheral surface of the belt 25. Each of the leading devices 24A and 24B is brought into contact with a side portion of the thread-like peeled material Ge, and guides the thread-like peeled material Ge along the conveying direction PX thereof.

The present invention is not limited to the configuration of the above-mentioned embodiment. In addition, the action and effect of the present invention are not limited to those described above. The present invention may be modified in various forms within the range not departing from the spirit of the present invention.

In the above-mentioned embodiment, the collecting member 23 comprising the first guiding portion 23a to the third guiding portion 23c is exemplified, but the present invention is not limited to this configuration. The collecting member 23 may be formed of only a rod-shaped member extending in the lateral direction, and directions of a plurality of guiding portions may be changed as appropriate in accordance with the conveying direction PX of the thread-like peeled material Ge. Further, the collecting member 23 may be formed into a plate shape or any other shape as long as the collecting member 23 can take up the thread-like peeled material Ge.

In the above-mentioned embodiment, the projecting portion 26 of the leading device 24 is formed of a rod-shaped member or a plate-shaped member made of metal. However, the present invention is not limited to this configuration. The projecting portion 26 may be made of a resin or any other material. Further, the projecting portion 26 may be formed integrally with the belt 25 through use of the same material as the belt 25.

REFERENCE SIGNS LIST 19 laser irradiation apparatus
23 collecting member
23a first guiding portion
23b second guiding portion
23c third guiding portion
24 leading device
25 belt
26 projecting portion
G glass film
Ga end portion of glass film
Gb end portion of glass film
Gc non-product portion
Gd product portion
Ge thread-like peeled material
L laser beam
PX conveying direction of thread-like peeled material
R glass roll

The invention claimed is:

1. A method of producing a glass roll, the method comprising: a conveying step of conveying a glass film along a longitudinal direction thereof;
a cutting step of irradiating the glass film with a laser beam from a laser irradiation apparatus while conveying the glass film by the conveying step, to thereby separate the glass film into a non-product portion and a product portion; and
a take-up step of taking up the product portion into a roll shape, to thereby form a glass roll,
wherein the cutting step comprises a step of winding a thread-shaped peeled material generated from an end portion of the product portion in a width direction around a rod-shaped collecting member, and leading the wound thread-shaped peeled material in a predetermined conveying direction by a leading device, and wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

2. The method of producing a glass roll according to claim 1, wherein part of the leading device is located above the second guiding portion.

3. A method of producing a glass roll, the method comprising: a conveying step of conveying a glass film along a longitudinal direction thereof;

a cutting step of irradiating the glass film with a laser beam from a laser irradiation apparatus while conveying the glass film by the conveying step, to thereby separate the glass film into a non-product portion and a product portion; and a take-up step of taking up the product portion into a roll shape, to thereby form a glass roll, wherein the cutting step comprises a collecting step of winding a thread-shaped peeled material generated from an end portion of the product portion in a width direction around a rod-shaped collecting member, and leading the wound thread-shaped peeled material in a predetermined conveying direction by a leading device, wherein, in the collecting step, the thread-shaped peeled material is wound around the rod-shaped collecting member such that a gap is formed between the thread-shaped peeled material and the rod-shaped collecting member, and the leading device is brought into contact with a part of the thread-shaped peeled material having the gap from the collecting member.

4. The method of producing a glass roll according to claim 3, wherein the leading device is arranged above the rod-shaped collecting member.

5. The method of producing a glass roll according to claim 4, wherein the leading device comprises:

an endless belt; and a projecting portion provided on an outer peripheral surface of the endless belt.

6. The method of producing a glass roll according to claim 5, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

7. The method of producing a glass roll according to claim 5, wherein the leading device is located on a downstream side of a tip end portion of the rod-shaped collecting member in the predetermined conveying direction.

8. The method of producing a glass roll according to claim 7, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

9. The method of producing a glass roll according to claim 4, wherein the leading device is located on a downstream side of a tip end portion of the rod-shaped collecting member in the predetermined conveying direction.

10. The method of producing a glass roll according to claim 9, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

11. The method of producing a glass roll according to claim 4, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

12. The method of producing a glass roll according to claim 11, wherein part of the leading device is located above the second guiding portion.

13. The method of producing a glass roll according to claim 3, wherein the leading device comprises:

an endless belt; and a projecting portion provided on an outer peripheral surface of the endless belt.

14. The method of producing a glass roll according to claim 13, wherein the leading device is located on a downstream side of a tip end portion of the rod-shaped collecting member in the predetermined conveying direction.

15. The method of producing a glass roll according to claim 14, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

16. The method of producing a glass roll according to claim 13, wherein the rod-shaped collecting member comprises:

a first guiding portion extending in a lateral direction;

a second guiding portion located on a downstream side of the first guiding portion in the predetermined conveying direction and angled inclined downward toward the downstream side in the predetermined conveying direction; and a third guiding portion extending downward and being located on a downstream side of the second guiding portion in the predetermined conveying direction.

17. The method of producing a glass roll according to claim 16, wherein part of the leading device is located above the second guiding portion.

18. The method of producing a glass roll according to claim 3, wherein the leading device is located on a downstream side of a tip end portion of the rod-shaped collecting member in the predetermined conveying direction.

19. The method of producing a glass roll according to claim 18, wherein the rod-shaped collecting member comprises:

a first guiding portion extending in a lateral direction;

a second guiding portion located on a downstream side of the first guiding portion in the predetermined conveying direction and angled downward toward the downstream side in the predetermined conveying direction; and a third guiding portion extending downward and being located on a downstream side of the second guiding portion in the predetermined conveying direction.

20. The method of producing a glass roll according to claim 19, wherein part of the leading device is located above the second guiding portion.

* * * * *